(12) United States Patent
Truong

(10) Patent No.: US 8,521,032 B2
(45) Date of Patent: Aug. 27, 2013

(54) OPTICAL FIBER INTERFACE SYSTEM AND CONNECTOR

(75) Inventor: Tuong Kien Truong, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 609 days.

(21) Appl. No.: 12/752,391

(22) Filed: Apr. 1, 2010

(65) Prior Publication Data
US 2011/0243566 A1 Oct. 6, 2011

(51) Int. Cl.
*H04B 10/00* (2006.01)
(52) U.S. Cl.
USPC ............................ 398/138; 398/136; 398/139
(58) Field of Classification Search
USPC .................................................. 398/136–139
See application file for complete search history.

(56) References Cited

U.S. PATENT DOCUMENTS

| | | | | |
|---|---|---|---|---|
| 5,007,699 | A * | 4/1991 | Stout | 385/46 |
| 5,012,467 | A * | 4/1991 | Crane | 370/445 |
| 5,455,703 | A * | 10/1995 | Duncan et al. | 398/136 |
| 5,783,873 | A | 7/1998 | Dohan et al. | |
| 6,487,914 | B1 * | 12/2002 | Hodge | 73/800 |
| 6,794,769 | B2 * | 9/2004 | Black | 307/104 |
| 2009/0060425 | A1 * | 3/2009 | Aronson | 385/88 |
| 2010/0092186 | A1 * | 4/2010 | Takahara | 398/208 |

FOREIGN PATENT DOCUMENTS
EP 0935865 B1 1/2004

OTHER PUBLICATIONS

"ARINC 629 digital communication system—application on the 777 and beyond", by S.J. Berger, Microprocessors and Microsystems 20 (1997) 463-471.
"ARINC Multi-Transmitter Data Bus", technical description prepared by the the Airlines Electronic Engineering Committee, (Mar. 31, 1999).

* cited by examiner

*Primary Examiner* — Dzung Tran
(74) *Attorney, Agent, or Firm* — McNees Wallace & Nurick LLC

(57) ABSTRACT

A media converter to converts digital fiber optic signals to electronic analog signals in the form of voltage doublet and vice-versa. The media converter includes a differential transmit transformer, a transmit stub interface and an optical fiber transmit interface arranged in serial flow communication in a first communication path; and a differential receive transformer, a receive stub interface and an optical fiber receive interface in serial flow communication in a second communication path. The first communication path converts a voltage doublet signal received from the electronic component to a digital optical signal for transmission to a passive optical star via the optical fiber coupler, and the second communication path converts a digital optical signal received from the passive optical star via the optical fiber coupler to an voltage doublet signal for transmission to the electronic component.

19 Claims, 5 Drawing Sheets

OPTICAL FIBER INTERFACE SYSTEM AND CONNECTOR

FIELD OF THE INVENTION

The present invention is directed to a method, apparatus and system for replacing an electrical data bus assembly with a fiber optic assembly, and more particularly, to a method apparatus and system for replacing ARINC 629 stub cable, bus cable, bus terminators, current mode couplers, coupler panels with large core plastic fiber and optical stars.

BACKGROUND OF THE INVENTION

ARINC 629 is a multi-transmitter, shared-bus protocol used for aeronautical and aviation communications networks. Existing optical fiber designs for ARINC 629 require major modification and recertification of the line replaceable units (LRU) with the introduction of fiber optic components that may be used to reduce weight, volume and installation effort, e.g., transmit and receive fiber optic serial interface modules (FOSIM) and changes in the LRU connector to accommodate glass optical fiber. Glass optical fiber is also difficult to install and maintain in an airplane environment due to special handling, small misalignment tolerance, and dust contamination on small diameter glass core.

While ARINC 629 may be one of the safest data bus protocols for critical aircraft control applications, deployment of the ARINC 629 standard has been limited because of the extra weight, bulk, equipment and installation effort associated with the ARINC 629 electrical physical layer.

It would be advantageous to provide an optical fiber solution for ARINC 629 that requires no modification to LRUs subscribing to ARINC 629 data buses, and that eliminates much of the extra weight, bulk, equipment and installation effort associated with the current ARINC 629 electrical physical layer.

SUMMARY OF THE INVENTION

In one embodiment, a media converter to converts between digital fiber optic signals and electronic signals. The media converter includes a differential transmit stub, a transmit stub interface and an optical fiber transmit interface arranged in serial flow communication in a first communication path; and a differential receive stub, a receive stub interface and an optical fiber receive interface in serial flow communication in a second communication path. The first communication path and the second communication path transmit signals in opposite directions between an electronic component and an optical fiber coupler. The first communication path converts an electronic signal received from the electronic component to a digital optical signal for transmission to the optical fiber coupler, and the second communication path converts a digital optical signal received from the optical fiber coupler to an electronic signal for transmission to the electronic component.

In another embodiment, an aircraft communications system includes a fiber optic data bus interconnected to multiple electronic components. Each electronic component is communicatively coupled to the fiber optic data bus through a media converter. Media converter converts between digital fiber optic signals and electronic signals. The media converter comprising: a differential transmit stub, a transmit stub interface and an optical fiber transmit interface in serial flow communication in a first communication path; and a differential receive stub, a receive stub interface and an optical fiber receive interface in serial flow communication in a second communication path. The first communication path and second communication path transmit signals in opposite directions between the associated electronic component and an optical fiber coupler. The first communication path converts an electronic signal received from the electronic component to a digital optical signal for transmission to the optical fiber coupler. The second communication path converts a digital optical signal received from the optical fiber coupler to an electronic signal for transmission to the electronic component.

In yet another embodiment, a method of converting an aircraft ARINC 629 electrical data bus network with an optical fiber data bus network without requiring modification to a line replaceable unit of an airplane is disclosed. The method includes providing a differential transmit stub, a transmit stub interface and an optical fiber transmit interface in serial flow communication in a first communication path; and providing a differential receive stub, a receive stub interface and an optical fiber receive interface in serial flow communication in a second communication path; transmitting signals in opposite directions between an electronic component and an optical fiber coupler along the first communication path and second communication path; converting an electronic signal received from the electronic component to a digital optical signal for transmission to the optical fiber coupler in the first communication path; and converting a digital optical signal received from the optical fiber coupler to an electronic signal for transmission to the electronic component in the second communication path.

Advantages include the benefits of plastic optical fiber, for example, ease of maintenance, less weight and bulk, and fewer electrical wiring hazards associated with electromagnetic interference, lightning, or corrosion.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Figure 1:
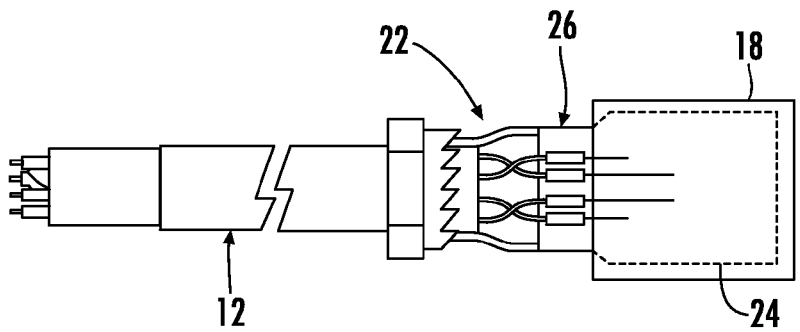
FIG. 1 shows a prior art electrical stub cable connection to an ARINC 629 current mode coupler.
Figure 2:
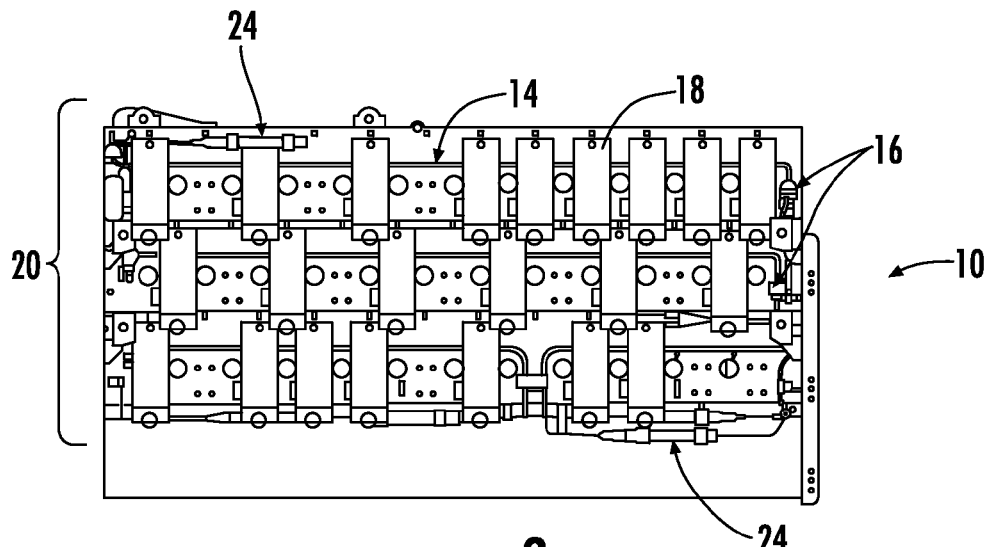
FIG. 2 shows a prior art ARINC 629 electrical coupler mounting panel.
Figure 3:
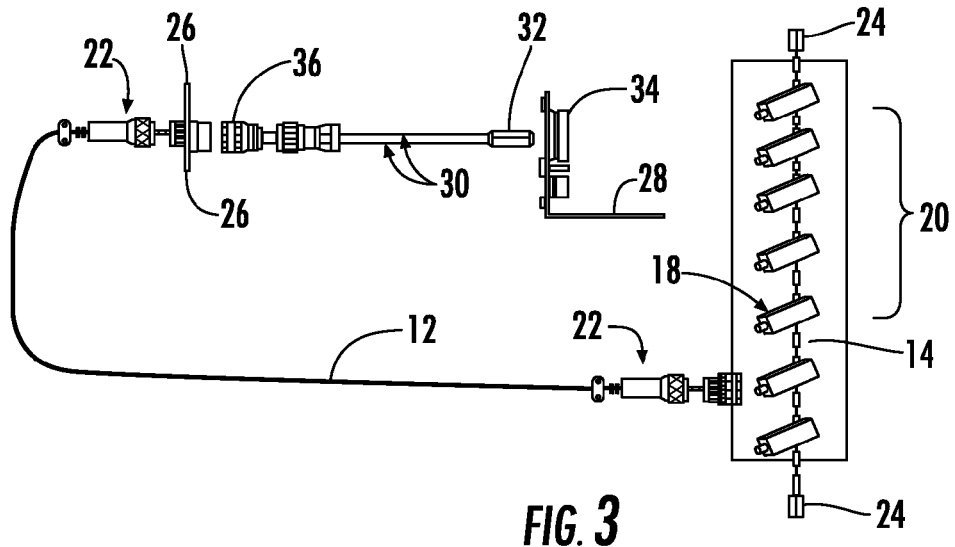
FIG. 3 shows a prior art ARINC 629 electrical data bus topology.

As shown in FIGS. 1 and 2, existing hardware used for an ARINC 629 electrical data bus, e.g., in a data network of an aircraft, includes, electrical stub cables 12, bus cables 14, bus terminators 24 (FIG. 3), ferrite beads 16, current mode couplers 18, and coupler mounting panels 20. ARINC 629 systems thus add weight and bulk to aircraft, are costly and difficult to install. Electrical stub cables 12 and bus cables 14 must be double shielded, and electrical connectors 26 require a zero-length pigtail backshell 22 with a circumferential internal shield 24. Current mode couplers 18 must be mounted manually and have good bonding/grounding, and bus polarity inspection must be performed manually for each coupler. Foil wrapping of bus 10 must also be performed manually for impedance compensation of current mode couplers 18. Coupler panels 20 are too large to be located in the equipment bay of a wide-body jet engine, for example, the Boeing 777, therefore requiring long runs of electrical stub cables 12 from line replaceable units (LRU) to the coupler panels. A line-replaceable unit (LRU) is a complex component of an airplane, ship or spacecraft, e.g., a black box or sealed unit such as a radio or other auxiliary electronic equipment, that is designed to be replaced quickly at a flightline or airport ramp area. It is advantageous to reduce weight, volume, installation and installation effort when designing aeronautical systems such as ARINC 629.

An existing ARINC 629 electrical data bus topology includes a plurality of current mode couplers 18 connected to data bus cable 14 in mounting panel 20. Stub cable 12 is connected at one end to a current mode coupler 18, and at the opposite end to a stanchion disconnect 26, through stub cable connectors 22. Stanchion disconnect 26 is connected to an LRU tray 28 through a transmit twisted pair cable and a receive twisted pair cable 30 through a pair of twinax contacts 32 that are inserted into an LRU interface 34, e.g., an ARINC 600 interface connector with each twisted pair terminate into one twinax. These twisted pair cables 30 are connected to the Serial Interface Module (SIM) inside the LRU. The SIM is a digital/analog hybrid module that provides digital interface to the communication protocol controller and analog interface to the current mode coupler via the stub cable.

Figure 4:
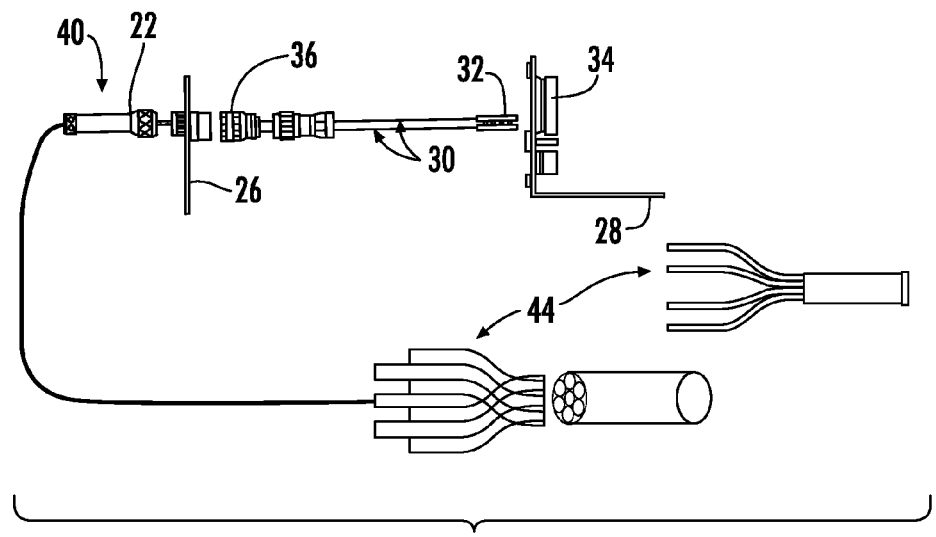
FIG. 4 shows an optical fiber converter and optical fiber cable connection to an LRU.

Referring now to FIG. 4, in an exemplary embodiment a media converter 40 (see FIG. 5) is disposed entirely within an existing stub cable connector 22. Stub cable connector 22 interfaces with LRU 28 at stanchion disconnect 26, mating to the existing circular stub connector 36. Stub cable connector 22 extracts power from the common-mode voltage on the differential pairs 30 and 32. Media converter 40 translates an electronic signal, e.g., a transmit voltage doublet signal 45 (FIG. 5) transmitted on electrical media, into digital optical pulses transmitted on optical fiber media. The voltage doublet signal 45 is received from LRU 28. Media converter 40 is configured to transmit optical pulses through optical fiber cable 42 onto a star coupler or optical bus 44. Media converter 40 is configured to translate optical pulses it receives from the star coupler into a receive voltage doublet signal 46 and transmits this voltage doublet signal back to the SIM. Media converter 40 may utilize a visible light source to transmit over plastic fiber cable 42, to simplify link diagnostics.

Figure 5:
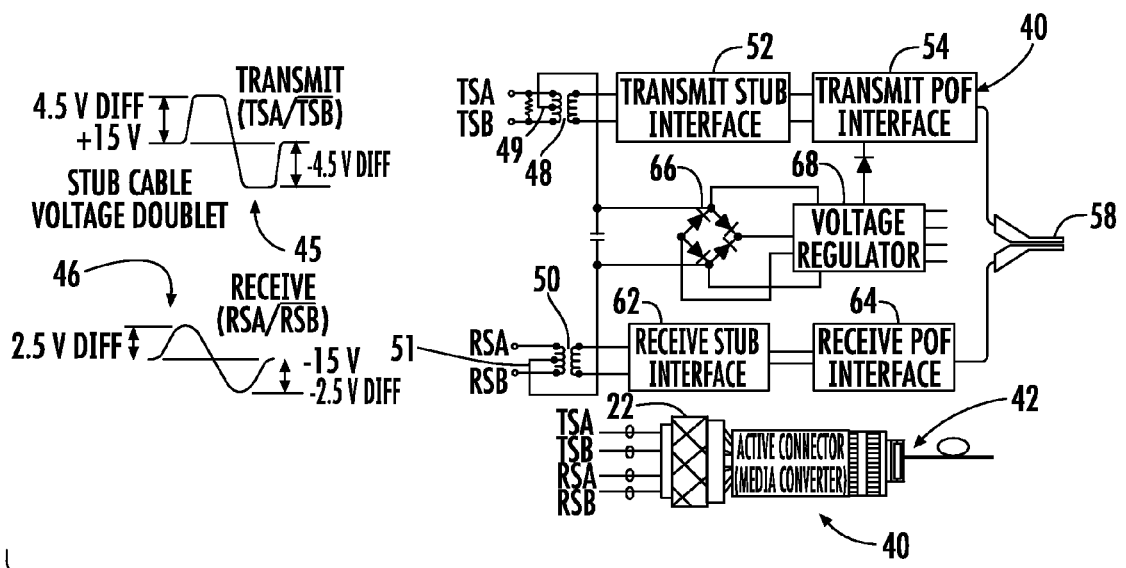
FIG. 5 shows a block diagram of a media converter of one embodiment of the invention.

Referring next to FIG. 5, an electrical signal input from the SIM is required in media converter 40 for communications between the SIM and the fiber optic active connector. By active connector, what is meant is that media converter 40 fits within the same connector body that interfaces to the stub cable. In the exemplary embodiment the electrical signal input includes voltage doublets 45 applied on a differential transmit stub A and B (TSA/TSB) 48, with approximately 9V peak-to-peak voltage. The width of voltage doublet 45 may be approximately 160 nanoseconds (ns), with 80 ns being the approximate width of the positive lobe, and 80 ns the approximate width of each lobe as measured at the base of the doublet, and about 62.5 ns lobe width as measured at half amplitude with about 15 ns rise & fall time.

Electrical signal output to the SIM includes voltage doublets 46 on differential receive stub (RSA/RSB) 50, having about 5V peak-to-peak voltage, with 160 ns doublet width, 80 ns lobe width at the base, and 62.5 ns lobe width at half amplitude.

The SIM may be configured to check for doublet integrity, e.g., a minimum of 20 ns lobe width and minimum +/−1.0V threshold for a valid doublet. Electrical cable impedance may be approximately 100 ohm for TSA/TSB and RSA/RSB, transformer coupled at both ends. Doublet pulse train 45 typically includes no preamble, and pulse train 45 is burst mode with long quiet time, e.g., up to tens of milliseconds between bursts. A typical doublet separation interval may be in the range of 250 ns.

Media converter 40 further includes a transmit stub or electrical interface 52. In a first communication path, transmit stub interface 52 is communicatively coupled with transmit stub 48 to receive the voltage doublet 45 and forward the voltage doublet to an optical fiber transmit interface 54 connected to a first leg 56 of a Y-coupler 58. Transmit stub interface 52 may be, e.g., a Doublets-to-Manchester signal converter. Manchester code and signal converters are well known to persons skilled in the art of signal processing. Other signal converters may be used to convert voltage doublets to digital pulse signals, including pulse position modulation and conventional digital pulse signals. Optical fiber transmit interface 54 may be implemented as an LED driver and LED for converting the Manchester signal into optical signals input to Y-coupler 58. Other suitable light sources and drivers may include, e.g., vertical cavity surface emitting laser (VCSEL) and edge emitting laser (EEL).

In the reverse direction of signal flow in a second communication path, differential receive stub A and B 50 is coupled with a receive stub interface 62. Receive stub interface 62 may be, e.g., a Manchester to Doublets converter. Receive stub interface 62 receives a Manchester coded signal from an optical fiber interface 64. Optical fiber interface 64 may be, e.g., a PIN-type photo diode that receives optical signals from Y coupler 58, and generates a voltage signal that is applied to a transimpedance amplifier, for input to an analog-to-digital (A/D) quantizer. Media converter 40 also includes a diode bridge 66 to convert AC signal power from differential transmit stub NB 48 and differential receive stub A/B 50, to feed a voltage regulator 68 that controls transmit optical fiber interface 55 through a transmit inhibit diode 70, and provides DC voltage at various levels for powering various loads.

Transmit signal TSA/TSB and receive signal RSA/RSB are preferably load match and connected to isolation transformers 48 and 50 respectively. Center taps 49, 51, respectively, on isolation transformers 48 and 50 provide common mode power. In an exemplary embodiment, isolation transformers may provide approximately +/−15V to bridge 66 and voltage regulator 68 (+15V on TSA/TSB and −15V on RSA/RSB).

Media converter 40 must be configured to handle the doublet reversed polarity as transmitted from the SIM and to transmit back to the SIM a reversed doublet, without any change to the optical signal. In receive only mode, when the electrical power is reversed (e.g., −15V on TSA/TSB and +15V on RSA/RSB), media converter 40 disables its transmitter circuit while still able to receive optical signals.

Figure 6:
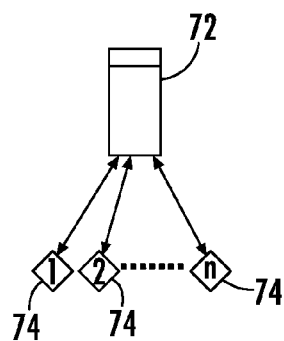
FIG. 6 shows a schematic diagram of a central reflective star optical data bus.

Referring next to FIG. 6, an optical signal from each subscriber LRU is routed to a central reflective star 72 (or cascaded stars) utilizing reflective star coupler 44. Central reflective star 72 distributes an incoming optical signal from one subscriber 74 evenly to all other subscribers. Central reflective star 72 also reflects the incoming signal to its own fiber, forming a feedback loop to allow the subscriber to monitor its own transmission and also to detect the presence of a collision on the bus and respond accordingly. This wrap-around optical loss is large enough due to inherently high attenuation of plastic fiber and connectors such that a given terminal does not saturate its own receiver when it is transmitting. A high power transmitter and a high sensitivity receiver may be used to compensate for fiber link loss and passive optical star power splitting loss.

In a preferred embodiment, plastic optical fiber is used for the fiber optic circuit elements and optical fiber 42 to reduce material costs and maintenance, although the invention is not limited to plastic fiber optic components, and glass fiber optic components may also be used to practice the invention. In one embodiment optical fiber 42 may be a large core 1 mm stepindex plastic fiber. However, conventional telecom grade smaller core glass fiber can also be used. Although large core (1 mm diameter) plastic optical fiber is the preferred embodiment for lower cost and ease of installation & maintenance, the invention can be implemented with smaller core glass fiber or plastic clad silica fiber by replacing the optical transmitter and detector for plastic fiber with the appropriate aperture transmitter and detector for glass fiber, and by replacing the plastic star coupler with glass fiber star coupler. A high sensitivity, high dynamic range large area photo detector may be used.

Although a Y-coupler 58 using discrete plastic fibers to split or combine the transmit and receive optical signal is disclosed, in alternate embodiments Y-coupler 58 can be implemented by an X coupler (or 2×2 coupler) or by waveguide coupler Media converter 40 interfaces electrically with the LRU by receiving voltage doublets from the SIM (Serial Interface Module) and transmitting voltage doublets back to the SIM. Since the doublet signals from the SIM arrive at 4 Mbps rate, the normal time interval between two doublets is 250 ns. The SIM expects to receive a wrap-around of its own transmission for self monitoring purpose, as well as to receive signals from other nodes on the bus.

In the existing electrical signal domain, an invalid doublet shape, e.g., width or amplitude smaller than a predetermined threshold, or invalid doublet separation interval, e.g., bunching of multiple doublets within 250 ns interval, is considered a consequence of collision on the bus during startup. The SIM detects this and signals a communication terminal controller (not shown) by suppressing the next two Manchester signal transition. The controller will cease transmission and will attempt retry. Additional collision is usually avoided because each terminal retries transmission by counting its own unique terminal gap (TG) timer counter when observing the bus quiet condition.

In the disclosed invention using the optical signal domain, media converter 40 detects optical bus collision by detecting a wrap-around optical signal that is wider than its own transmitted signal, and/or detecting a wrap-around optical signal that is composed of multiple optical pulses bunching together within a 250 ns interval. To signal to the SIM that an optical bus collision has occurred, in one embodiment media converter 40 may transmit two doublets next to each other, i.e. violate the 250 ns separation interval. Alternately, media converter 40 may transmit an invalid voltage doublet, i.e., violate the minimum doublet width and minimum amplitude threshold. In a further embodiment media converter 40 may transmit only one lobe of the doublet to signal a bus collision condition.

Although in the preferred embodiment signal transmission is bidirectional transmit and receive over a single fiber data link from the optical transceiver to the reflective optical star coupler, the invention can be implemented with dual fiber for separated transmit and receive using a transmissive optical star coupler.

There are a variety of ways to build reflective star couplers. A reflective star coupler can be implemented using a mixing rod with the bidirectional input/output fibers aligned and butted to one end of the mixing rod and a reflective mirror at the other end of the mixing rod. The mirror can be flat or concave. In a different design, the reflective star coupler can be implemented by traditional fused biconical taper (FBT) method with 'n' fibers loop backed to itself to create a '2n' port star where the fibers are twisted, heated, drawn in the middle to induce optical coupling. There are other well known methods as well such as using optical waveguide instead of discrete fibers to construct the star coupler.

Figure 7:
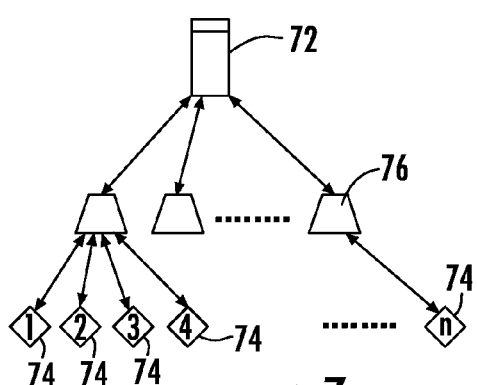
FIG. 7 shows a schematic diagram of a hybrid reflective star optical data bus with splitter/combiners.

Although the preferred implementation is central star, i.e., one optical star per data bus as shown in FIG. 6, to take advantage of single bidirectional fiber, the invention can be implemented with cascaded or hybrid reflective star topology, as shown in FIG. 7, using a reflective star 72 in combination with one or more splitter/combiner 76. Hybrid star topology may be used to connect clusters of nodes that are physically far apart, e.g., clusters of nodes in the cockpit, tail section, left wing or right wing, using a single bidirectional fiber link.

Figure 8:
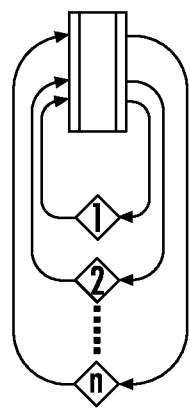
FIG. 8 shows a schematic diagram of a central transmissive star optical data bus for a dual fiber optical cable.
Figure 9:
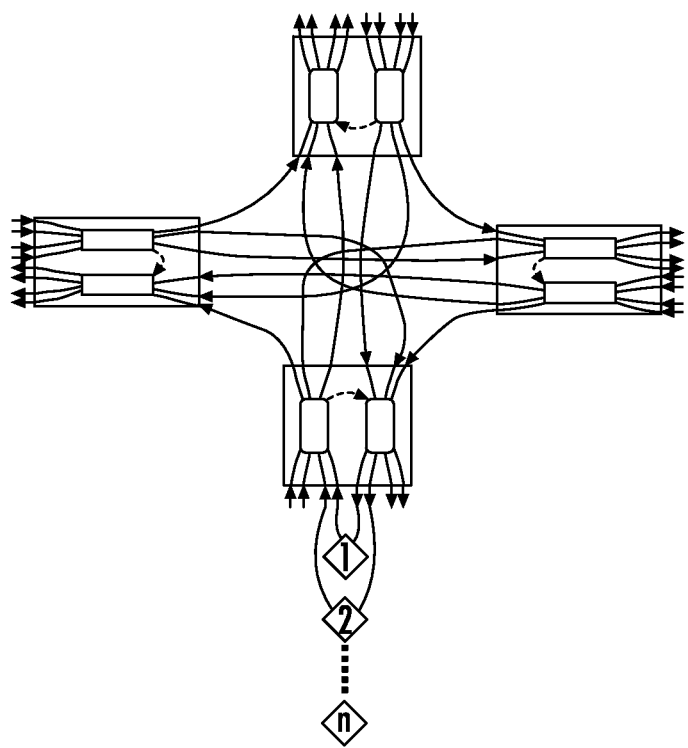
FIG. 9 shows a schematic diagram of a cascaded transmissive star optical data bus for a dual fiber optical cable.

Dual fibers with separate transmit and receive fiber can also be used in conjunction with central transmissive star (see, e.g., FIG. 8) or cascaded transmissive stars (see, e.g., FIG. 9). A transmissive star transmits optical signal from any one of the input fibers to all of the output fibers.

The chosen topology depends on where the LRUs are located and depends on the available optical power budget. Reflective star with single bidirectional fiber requires more power budget due to additional optical loss of splitter/combiner. Transmissive star uses dual fiber one each for transmit and receive does not incur this additional. However, a transmissive star includes twice as many fibers and therefore incurs higher cost, weight, volume, and associated installation effort.

Figure 10:
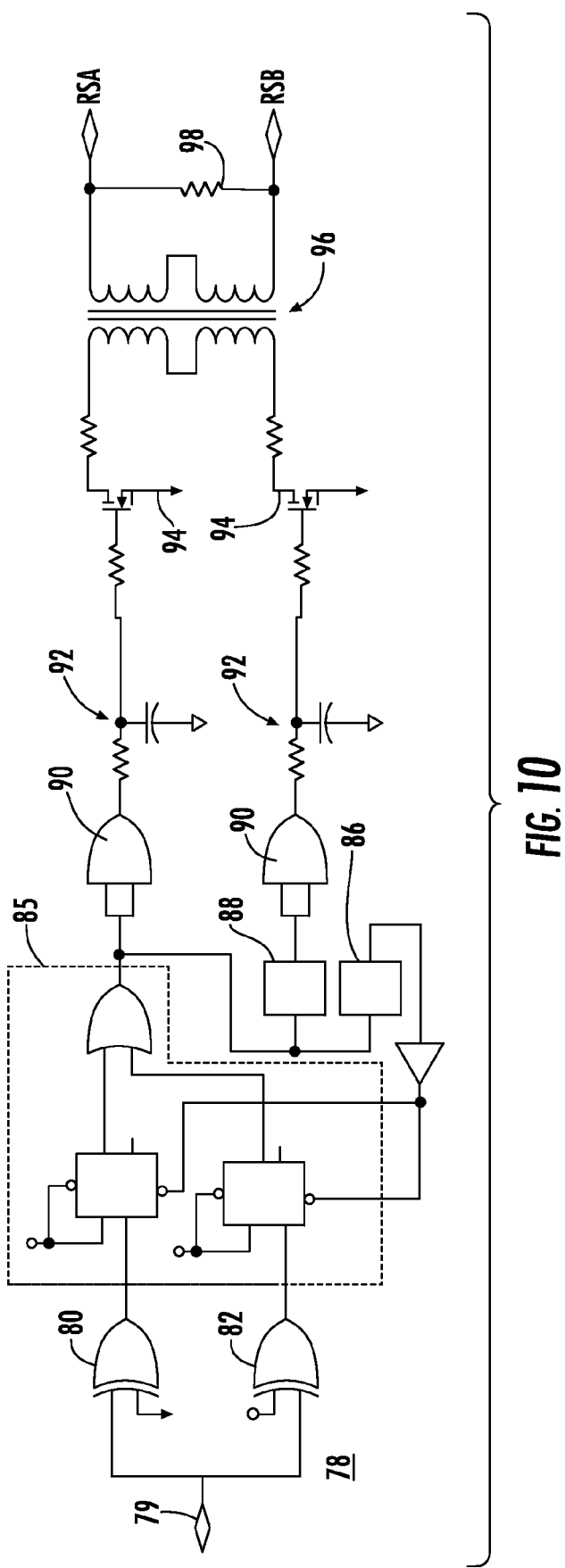
FIG. 10 shows a Manchester to Doublets conversion circuit.

Referring next to FIG. 10, one embodiment of a Manchester to Voltage Doublet circuit 78 is shown. This circuit converts each transition of the Manchester pulse train into a voltage doublet. From the TTL level input 79 derived from the digital optical signals, two XOR gates 80, 82 form a zero-skew complementary outputs which drive a state machine 85 to generate the two lobes of the voltage doublet signal. A delay element 86 within the feedback loop of the state machine controls the pulse width. The other delay element 88 controls the time delay between the two pulses. At the output of state machine 85 are the buffers 90 and low pass filters 92 that are configured to round off the edges of the square pulses. The two separate pulses drive a pair of power FETs 94, one pulse to drive the positive lobe and the other to drive the negative lobe of the stub voltage doublet signal. FETs 94 drive a unity transformer 96 in a push-pull configuration that transmits the voltage doublet onto the stub cable RSA/RSB. A shunt resistor 98 at the output of the transformer matches the stub cable's characteristic impedance.

Figure 11:
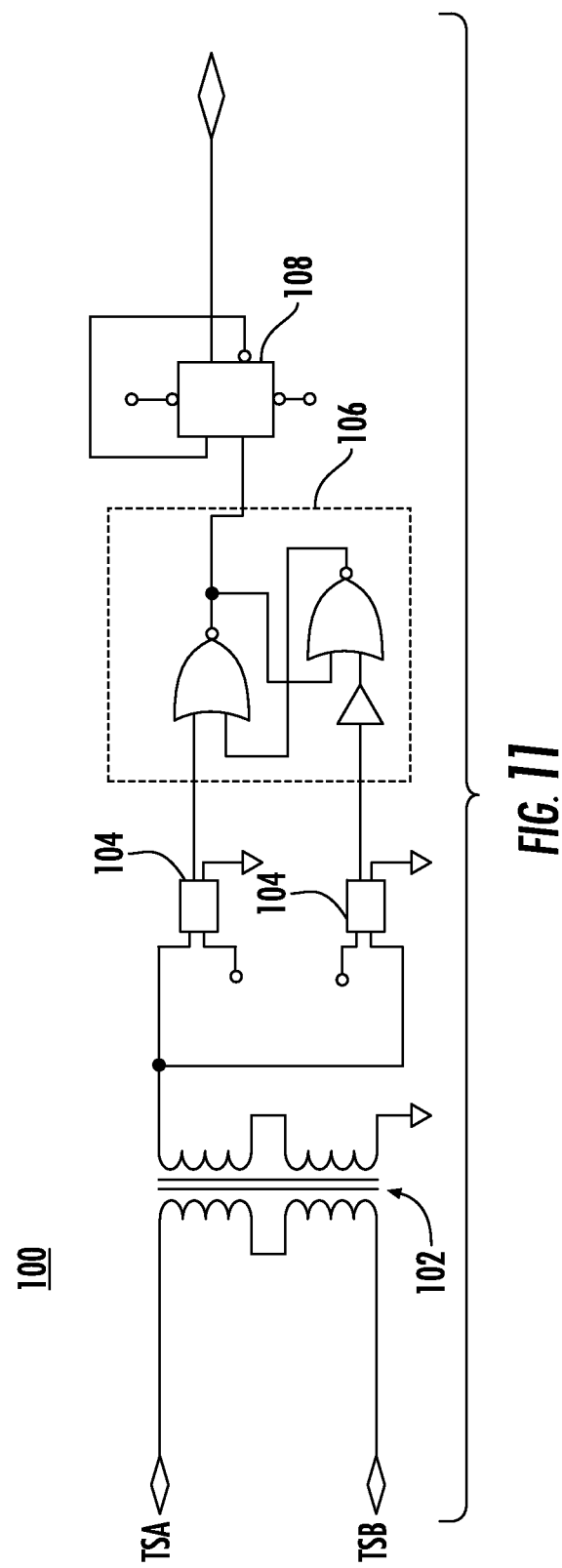
FIG. 11 shows a Doublet to Manchester conversion circuit.

FIG. 11 illustrates one embodiment of a Voltage Doublet to Manchester circuit 100. Circuit 100 converts each voltage doublet on stub cable TSA/TSB into one transition of a Manchester pulse train. A unity transformer 102 converts the differential voltage doublet into single-ended voltage doublet signal. The single-ended receive signal is routed through a pair of complementary voltage comparators 104. Complementary voltage comparators 104 compare the signal to a predetermined positive threshold for the positive lobe and a negative threshold for the negative lobe. This threshold is different for different mode of receive operation, e.g., a higher threshold may be used for a wrap-around threshold. A subsequent latch circuit 106 detects when both thresholds are crossed, indicating a valid doublet with two valid lobes. The following flip-flops 108 decodes each doublet into one transition of the TTL Manchester signal to drive the optical transmitter.

Because current mode couplers and coupler panels are not required in the disclosed invention, the optical devices such as central reflective stars 72 may be mounted near LRUs, rather than placing the devices remotely outside the equipment bay. The optical star, or central reflective star 72, is a small cylinder that can be secured with plastic zip ties to the stanchion disconnect or to an existing wiring bundle without any special mounting provision as may be required for an electronic box. The average stub cable length can be reduced by at least half to achieve lower link attenuation. Shorter visible wavelength may be selected over conventional red (650 nm) to reduce the attenuation of plastic optical fiber by approximately half. These reductions in attenuation enable a reduction in the optical power budget of the transceiver to a practical and low cost implementation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A media converter to convert between digital fiber optic signals and electronic signals comprising:
 a differential transmit stub, a transmit stub interface and an optical fiber transmit interface in serial flow communication in a first communication path; and
 a differential receive stub, a receive stub interface and an optical fiber receive interface in serial flow communication in a second communication path;
 the first communication path and second communication path transmitting signals in opposite directions between an electronic component and an optical fiber coupler;
 the first communication path configured to convert an electronic signal received from the electronic component to a digital optical signal for transmission to the optical fiber coupler; and
 the second communication path configured to convert a digital optical signal received from the optical fiber coupler to an electronic signal for transmission to the electronic component; wherein:
 the media converter further includes a diode bridge, a voltage regulator and a transmit inhibit diode;
 the diode bridge is configured to convert AC electrical power from the electronic signal power received from the differential transmit stub and the differential receive stub, and provide DC power to the voltage regulator; and
 the voltage regulator is configured to control the optical fiber transmit interface through the transmit inhibit diode and to provide DC voltage at a plurality of DC voltage levels.

2. The media converter of claim 1, further comprising an optical fiber Y-coupler, wherein the transmit stub interface is communicatively coupled with the transmit stub to receive the electronic signal and forward the electronic signal to the optical fiber transmit interface connected to a first leg of the Y-coupler.

3. The media converter of claim 1, wherein:
 the differential receive stub is coupled with a receive stub interface that receives optical signals from a second leg of the optical fiber Y- coupler, and
 the receive stub interface generates the electronic signal based on the digital optical signal; for transmission to the electronic component.

4. The media converter of claim 1, wherein the receive stub interface comprises a Manchester to Doublets converter.

5. The media converter of claim 1, wherein the optical fiber transmit interface comprises an LED driver and LED, and the LED driver and LED are configured to convert a Manchester signal into the optical signals input to the optical fiber Y-coupler.

6. The media converter of claim 1, wherein the transmit stub interface comprises a Doublets-to-Manchester signal converter.

7. The media converter of claim 1, wherein:
 the optical fiber receive interface comprises a PIN-type photo diode, a transimpedance amplifier, and an analog-to-digital quantizer;
 the PIN-type photo diode, the transimpedance amplifier, and the analog-to-digital quantizer configured to receive digital optical signals from the Y coupler and generate an electronic signal that is applied to the transimpedance amplifier for input to the analog-to-digital quantizer; and
 the analog-to-digital quantizer connected to the receive stub interface.

8. The media converter of claim 1, wherein each of the transmit stub and the receive stub comprises a load match and isolation transformer, each load match and isolation transformer further comprising a center tap, respectively, to provide common mode voltage to the diode bridge and voltage regulator.

9. The media converter of claim 1, wherein the media converter is configured to receive a voltage doublet in a reverse polarity as transmitted from the electronic component, and to transmit back to the electronic component a reversed voltage doublet without changing the optical signal.

10. The media converter of claim 1, wherein the media converter is configured in a receive only mode to disable the first communication path and to receive optical signals in the second communication path, wherein an electrical power is reversed on the transmit stub and the receive stub.

11. The media converter of claim 1, wherein the electronic signal is a voltage doublet signal.

12. A aircraft communications system comprising:
 a fiber optic data bus and a plurality of electronic components, each electronic component of the plurality of electronic components communicatively coupled to the fiber optic data bus through a media converter configured to convert between digital fiber optic signals and electronic signals, the media converter comprising:

a differential transmit stub, a transmit stub interface and an optical fiber transmit interface in serial flow communication in a first communication path; and a differential receive stub, a receive stub interface and an optical fiber receive interface in serial flow communication in a second communication path;

the first communication path and second communication path transmitting signals in opposite directions between an electronic component and an optical fiber coupler;

the first communication path configured to convert an electronic signal received from the electronic component to a digital optical signal for transmission to the optical fiber coupler; and the second communication path configured to convert a digital optical signal received from the optical fiber coupler to an electronic signal for transmission to the electronic component; wherein:

the media converter further includes a diode bridge, a voltage regulator and a transmit inhibit diode;

the diode bridge is configured to convert AC electrical power from the electronic signal power received from the differential transmit stub and the differential receive stub, and provide DC power to the voltage regulator; and the voltage regulator is configured to control the optical fiber transmit interface through the transmit inhibit diode and to provide DC voltage at a plurality of DC voltage levels.

13. The communications system of claim 12, wherein the fiber optic data bus further comprises a central reflective star configured to receive and distribute a transmitted optical signal from a first electronic component to all other electronic components coupled to the fiber optic data bus; and to reflect the incoming first optical signal to the first electronic component through an optical fiber cable, the reflected first optical signal forming a feedback loop to allow the first electronic component to monitor the transmitted optical signal and to detect the presence of a collision on the data bus.

14. The communications system of claim 12, wherein the fiber optic data bus further comprises a reflective star and at least one splitter/combiner, the splitter/combiner configured as a hybrid reflective star, at least some of the splitter/combiners connected to a plurality of the electronic components at nodes, and to communicate between the reflective star and the nodes by splitting outgoing signals and combining incoming signals to the reflective star.

15. The communications system of claim 12, wherein the fiber optic data bus is interconnected through a single bidirectional fiber link.

16. The communications system of claim 12, wherein the fiber optic data bus further comprises a central transmissive star and a dual fiber optical cable, the dual fiber optical cable comprising a transmit fiber and a receive fiber, the central transmissive star configured to transmits an optical signal from the input fiber of the first electronic component to the output fibers of all electronic components in communication with the fiber optic data bus.

17. The communications system of claim 12, wherein the fiber optic data bus further comprises a cascaded transmissive star and a dual fiber optical cable, the dual fiber optical cable comprising a transmit fiber and a receive fiber, the central transmissive star configured to transmits an optical signal from the input fiber of the first electronic component to the output fibers of all electronic components in communication with the fiber optic data bus.

18. The communications system of claim 17, wherein the fiber optic data bus is interconnected through a dual fiber cable.

19. A method of converting an aircraft ARINC 629 electrical data bus network with an optical fiber data bus network without requiring modification to a line replaceable unit of an airplane, the method comprising:

providing a differential transmit stub, a transmit stub interface and an optical fiber transmit interface in serial flow communication in a first communication path; and providing a differential receive stub, a receive stub interface and an optical fiber receive interface in serial flow communication in a second communication path;

transmitting signals in opposite directions between an electronic component and an optical fiber coupler along the first communication path and second communication path;

converting an electronic signal received from the electronic component to a digital optical signal for transmission to the optical fiber coupler in the first communication path; and converting a digital optical signal received from the optical fiber coupler to an electronic signal for transmission to the electronic component in the second communication path;

providing a diode bridge, a voltage regulator and a transmit inhibit diode;

converting an AC electrical power from the electronic signal received from the differential transmit stub and the differential receive stub, and providing DC power to the voltage regulator; and controlling the optical fiber transmit interface through the transmit inhibit diode.

* * * * *